July 12, 1938.    M. EWALD    2,123,187

PEELING KNIFE

Original Filed Oct. 26, 1934

INVENTOR
MARK EWALD
BY [signature]
ATTORNEY

Patented July 12, 1938

2,123,187

UNITED STATES PATENT OFFICE 2,123,187

PEELING KNIFE

Mark Ewald, Olympia, Wash., assignor to Special Equipment Company, Portland, Oreg., a corporation of Oregon Application October 26, 1934, Serial No. 750,151
Renewed September 20, 1937

2 Claims. (Cl. 146—43)

This invention has to do with a device for the treating of fruit preparatory to canning and relates particularly to a turnable knife adapted to remove the peel from the fruit.

The peeling knife manufactured in the manner hereinafter disclosed, is adapted to cooperate with a fruit holding cup for removing the epidermis from a half fruit held within the cup in a manner exposing the flat severed face and with the epidermis engaging the cup walls, which latter conform generally to the periphery of the fruit. The knife is disposed for rotation about an axis substantially within the plane face of the fruit to carry its thin ribbon-like body along the inner side of the walls of the cup and through the meat of the fruit just beneath the surface of the epidermis.

For an understanding of a cup in which the knife here described is useful, reference may be had to the copending application of Mark Ewald, serially numbered 63,019 filed February 8, 1936, the same being a continuation of 627,549, filed August 5, 1932, entitled Fruit holding cup, and of which application the present is a continuation in part. The cup structure is claimed in such application, Serial No. 627,549.

A complete knowledge of the machine with which the present invention is adapted to be combined may be had by referring to a co-pending application of Mark Ewald, serially numbered 636,447, filed October 6, 1932, and entitled "Pear treating apparatus."

Reference is had to my prior application, Serial No. 711,354, filed February 15, 1934, issued as Patent No. 2,060,802 on November 17, 1936, entitled "Process of knife manufacture," whereof the present application is a division. Such patent contains claims to the process of making the knife per se. In addition, reference is also made to my prior application, Serial No. 750,152, now pending, filed October 26, 1934, and entitled "Process of peeling," which latter application is also a division of application 711,354. Claims in application 750,152 are made to the process involved in peeling the fruit by the cooperation of the improved knife of the present application and the specific cup structure disclosed in said application 750,152.

Among the objects of the present invention is the provision of:

An improved form of peeling knife adapted to be passed beneath the peel of a fruit with a single rotative movement without mutilating the fruit.

A new peeling knife designed for rotation about an axis in a plane defined by the cutting edge thereof.

An improved knife of a metal strip deformed into the shape of a longitudinal element extending antipodally of the surface of a pear or other fruit and rotatable about an axis coinciding with the center of curvature of the inner face of the knife.

These objects and such other objects as may hereinafter appear are obtained by the novel construction, unique arrangement, and improved combination of elements illustrated in the accompanying sheet of drawing, hereby made a part of this application, and in which.

Like reference characters are used to designate similar parts in the drawing and in the description of the invention which follows.

Figure 1:
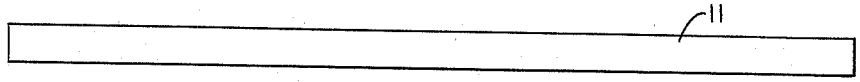
Figure 1 is a plan view of a blank of metal from which the improved knife may be made.

The blank from which blade 10 is made is shown at the initial stage of its manufacture in Figure 1. Such blank is in the form of a long rather narrow strip 11 of suitable metal. The thickness of the strip 11 depends upon its length and the size desired in the finished article. At present knives like the one illustrated are made in four sizes, the material being stainless cutlery steel. In the smallest size of knife, the steel strip 11 generally is .042 of an inch in thickness. In the largest of the four sizes of knives, the metal strip 11 generally has an original thickness of .065 of an inch.

Figure 2:
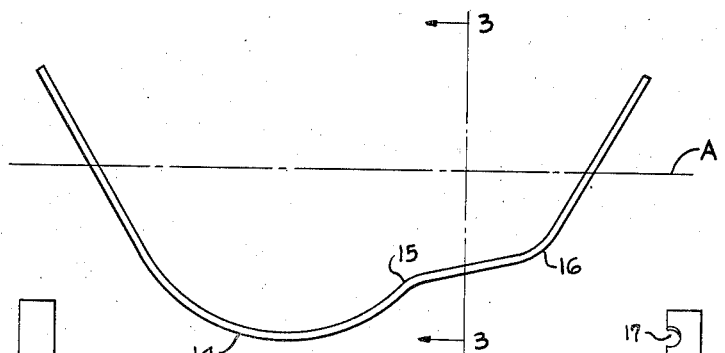
Figure 2 is a side view of the blank of Figure 1 subsequent to it being distorted to approximate the shape of the finished article.
Figure 3:
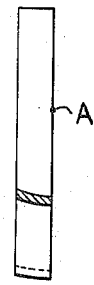
Figure 3 is a transverse sectional view of the unfinished knife taken at the line 3—3 of Figure 2.
Figure 4:
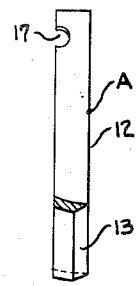
Figure 4 is a view similar to Figure 3 but after a partial sharpening of the knife.

After the strip 11 has been obtained, as by shearing or stamping it from a larger piece of sheet material, the strip is subjected to the action of complemental swaging tools whereby it is deformed longitudinally into the shape illustrated in Figure 2. In addition to the longitudinal curvature given to the blade, shown in Figure 2, the blank is given a slight curve transversely of its body, as shown in Figure 3. In Figures 2, 3 and 4, the axis of rotation of the blade, when it is finished, is indicated by a broken line and dot designated by the character "A". The axis coincides substantially with an edge of the blade, such edge being the cutting edge. The transverse curvature of the blade is such that the body of the blade at all points except the outer face of the cutting edge substantially is concentric to the axis A. Such is true for the whole length of that section of the blade lying to one side of the axis of rotation.

Figure 4 is a view similar to Figure 3 but illustrates the unfinished blade after it has been partly ground (13) along its leading edge 12. In forming the section 13, which is coextensive with sections 14, 15 and 16 of the blade, about two-thirds the thickness of the material is removed at the lower part of the leading edge 12, the face 13 extending backwardly about one-third of the width of the blade. At this time notches 17 may be formed at opposite ends of the blade to facilitate attachment to blocks 18 for rotation, one block being shown in Figures 5 and 6.

The notches 17 are so placed that the axis "A" of the blade will coincide with the center of a shaft opening 19 in each of the blocks 18, such openings receiving shafts 20 for rotating the blocks 18.

After the face 13 and the notches 17 have been formed in the blank, the blade is subjected to a suitable heat treatment for tempering. A satisfactory heat treating process has been found to include the steps of heating the blade to 1725° Fahrenheit, then quenching in oil and leaving the article in oil of 400° Fahrenheit for a short period of time. This being done, the knife is placed in a suitable device, not shown, for oscillating it about axis "A" while a small grinding member is moved back and forth along its inner face. In this manner, the inner face of the blade is given a surface which at all points focuses truly upon the axis "A" of rotation.

Figures 5, 6:
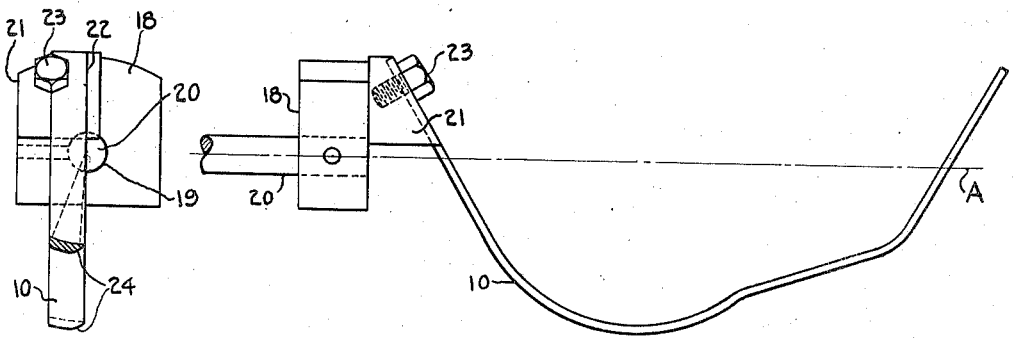
Figure 5 is a fragmentary view of the finished knife, showing the manner of attachment to means for its rotation.
Figure 6 is a left side view of the parts shown in Figure 5.

Next, the face of the outer section 13 of the blade is rounded as shown in Figure 5 adjacent the leading edge 12 thereof so that the outer face converges upon the inner face and forms a cutting edge, the cutting edge being substantially flush with the inner face. Figure 5 illustrates a cross section of a finished blade intermediate its length.

It will thus be seen that I have provided a knife, the inner face of which is concave transversely of the length of the knife whereby the blade is adapted to glide substantially freely along the periphery of the portion of the fruit from which the peel has been severed. It will also be observed that the inner face of my improved knife is curved in a direction transversely of the length of the knife so that all points thereof are equi-distant from the axis of rotation of the knife whereby to prevent bruising or squeezing of the fruit during the peeling operation.

It will also be observed that the bevel of the blade is on the outer face of the knife. It will also be apparent that I have provided a knife adapted to pass through a cup-shaped container in close proximity to the inner wall of the container and through the body of the fruit held therein adjacent the peel and wherein the cutting edge of the knife lies substantially flush with the inner face of the blade, the outer face of the blade being beveled rearwardly at the cutting edge whereby the pressure upon the peel and the pull upon the body of the fruit is directed outwardly of the fruit and against the wall of the cup at and just ahead of the cutting edge of the knife.

It will also be observed that in my improved knife the transverse curvature on the inner surface of the knife is so shaped as to be a segment of substantially a true circle with varying radii perpendicular to the axis of rotation of the knife and the center of these radii coincide with and fall upon the center line of the axis of rotation.

Figure 6 is a side view of one of the blocks 18 to which the blade 10 is attached for rotation. The block 18 receives a rotating shaft 20 in its shaft opening 19. Any suitable fastening means, as a pin, may be used therebetween. A lug 21 projecting from the block has an inclined face traversed by a groove 22 into which groove the end of the blade beyond its cutting edge may be seated. A cap screw 23 passing through the notch 17 detachably holds the blade in place upon the block 18. The other end of the blade 10 may be similarly attached to a complemental block 18, not shown.

By shaping the inner face of the blade 10 about the axis of rotation "A", the knife when passed through the body of a fruit, will glide freely along the periphery of the portion of the fruit from which the peel has been severed, the body of the knife not crowding or distorting the body of the fruit from which the peel is separated. The trailing section of the face of the blade will be at the same radius from the axis of rotation of the blade as the leading and cutting edge portion and hence there will be no tendency for the body portion to squeeze or bruise the useful section of fruit. The radius at which the outer face of the knife swings or rotates is such as to carry that face a small fraction of an inch from the inner wall of the cup that holds the fruit.

The claims in this application are limited to the novel features of construction of the peeling knife per se.

What is claimed as new and is desired to be secured by Letters Patent of the United States is:

1. A peeling blade having an axis about which it is turned comprising a relatively narrow blank strip of metal having a cutting edge shaped to follow the contour of a peripheral element extending antipodally of an article to be peeled, the axis of rotation of said blade subtending such edge, the inner face of said strip being dished transversely of and substantially coextensively of the length of said edge so that each transverse section thereof focuses upon the respective point in such axis from which it is normally disposed, and the outer face of the strip converging upon the inner face to provide the cutting edge flush with such inner face.

2. A peeling blade for peeling half fruit, and having an axis of rotation about which it is turned, said blade comprising a relatively narrow blank strip of metal curved to conform to the curvature of the fruit to be peeled, the inner face of the strip transversely of the length of the strip being concentric to the axis of rotation of the blade, a portion of the outer face of the blade being disposed to form a relatively blunt angle with the inner face of the blade to provide a cutting edge substantially at the inner face of the blade and coinciding substantially with the axis of rotation of the blade.

MARK EWALD.